(12) United States Patent
Fujita et al.

(10) Patent No.: US 6,336,627 B1
(45) Date of Patent: Jan. 8, 2002

(54) SUSPENSION UNIT HAVING A MAGNETO-SPRING

(75) Inventors: Etsunori Fujita; Yasuhide Takata; Kazuyoshi Chizuka; Hiroki Ohshimo, all of Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/504,940

(22) Filed: Feb. 16, 2000

(30) Foreign Application Priority Data

Feb. 17, 1999 (JP) ............................................ 11-038738

(51) Int. Cl.[7] ................................................. A47C 7/14
(52) U.S. Cl. ................... 267/131; 267/140.11; 248/581
(58) Field of Search ........................ 267/140.11, 140.4, 267/142, 131, 136; 248/562, 560, 576, 581, 589; 108/144.11, 145, 147

(56) References Cited

U.S. PATENT DOCUMENTS

| 3,874,626 A | * | 4/1975 | Gross et al. ................. 248/399 |
| 4,638,982 A | * | 1/1987 | Misher et al. ............... 267/131 |
| 4,664,352 A |   | 5/1987 | Shibuki et al. |
| 4,822,094 A | * | 4/1989 | Oldfather et al. .......... 296/65.1 |
| 4,969,624 A | * | 11/1990 | Ustelentsev et al. ........ 248/550 |
| 5,004,206 A | * | 4/1991 | Anderson ................... 248/585 |
| 5,169,112 A | * | 12/1992 | Boyles et al. ............... 248/550 |
| 5,251,864 A | * | 10/1993 | Itou ........................... 248/588 |
| 5,346,170 A | * | 9/1994 | Schmidt et al. ............. 248/550 |
| 5,735,509 A | * | 4/1998 | Gryp et al. .................. 267/131 |
| 5,771,816 A | * | 6/1998 | Zaguroli, Jr. ............... 108/147 |
| 5,833,198 A | * | 11/1998 | Graetz ........................ 248/370 |
| 5,950,977 A | * | 9/1999 | Proksch et al. ............. 248/421 |
| 6,084,329 A | * | 7/2000 | Fujita et al. ................ 310/90.5 |
| 6,202,972 B1 | * | 3/2001 | Manavi ....................... 248/421 |

FOREIGN PATENT DOCUMENTS

EP            0 878 638 A2    11/1998

* cited by examiner

Primary Examiner—Robert J. Oberleitner
Assistant Examiner—Benjamin A. Pezzlo
(74) Attorney, Agent, or Firm—Wenderoth, Lind & Ponack, L.L.P.

(57) ABSTRACT

A suspension unit includes a lower frame, an upper frame vertically movably mounted on the lower frame, and two link mechanisms disposed on respective sides of the upper and lower frames for connecting them to each other. Each of the two link mechanisms includes a parallel link mechanism having two arms extending generally parallel to each other and a pantograph-shaped link mechanism having a plurality of arms. The suspension unit further includes two permanent magnets each fixedly mounted on one of the upper and lower frames with like magnetic poles opposed to each other, a metallic spring engaged with one of the pantograph-shaped link mechanisms, and a shock absorber engaged with the other of the pantograph-shaped link mechanisms that has spring properties. With such construction, vibration below a predetermined amplitude is absorbed by the spring properties of the other of the pantograph-shaped link mechanisms with the shock absorber not operated.

7 Claims, 13 Drawing Sheets

SUSPENSION UNIT HAVING A MAGNETO-SPRING

BACKGROUND OF THE INVENTION

1. Field of the Invention

The present invention relates generally to a suspension unit and, in particular but not exclusively, to a suspension unit capable of achieving vibration and shock absorption with a small stroke by joining linear characteristics of metallic springs and non-linear characteristics of a magneto-spring to provide linear characteristics under normal conditions of use, and non-linear characteristics as a whole.

2. Description of the Related Art

In recent years, vehicle technologies including automobile technologies have been remarkably developed, and the safety and riding-comfort as well as the maneuverability are desired. Vibration is a great factor that gives rise to various problems such, for example, as fatigue or vision problems and, hence, to enhance the riding-comfort by a reduction of vibration is an important problem from the viewpoint of active-safety. Because of this, a mechanism for reducing vibration which vehicles cause on the human body is needed, and various vibration models have been hitherto proposed and put into practical use.

In general, vibration characteristics depend on the loaded mass and the input. It is considered that the dependence on the loaded mass is closely related to the curvature of load-deflection curves, while the dependence on the input is closely related to the hysteresis of load-deflection characteristics. In suspension systems for automotive vehicles, it is very difficult to adjust parameters such as the spring constant and the like under various conditions: the road surface condition, the stability of control, the impedance condition and the like.

Suspension systems having low damping characteristics exhibit good vibration characteristics in a high-frequency region, but the vibration transmissibility at a resonant point becomes large and, hence, a large impulsive force cannot be absorbed. In contrast, if the damping characteristics are enhanced, the vibration characteristics in the high-frequency region are deteriorated, though the vibration characteristics at the resonant point and the absorbency of the impulsive force are improved. In order to balance the vibration absorption and the shock absorption in a higher level, a stroke is required. However, if the stroke becomes large, the unpleasant feeling increases, and some problems such as a movement of the eyes, a sway of the body, or difficulties in the control of the pedal are encountered in controlling automotive vehicles.

For these reasons, conventional passive vibration models have a limit on their performance. For the optimization under various conditions, the active control is needed which provides ideal vibration characteristics with a small stroke. However, because the active control applies a force to the system via actuators and the like, it is disadvantageously accompanied by energy consumption. Also, the control characteristics depend on the performance of actuators or sensors and, hence, the active control also has a limit on its performance. Furthermore, the active control makes use of electric energy and is, therefore, not entirely satisfactory in reliability.

Recently, with the practical use of permanent magnets that have a high coercive force and a high residual magnetic flux density, research is flourishing in areas such as mechanical structures and magnetic systems that utilize magnetic levitation, magnetic bearings, dampers employing a magnetic fluid, or the like. Because magnetic levitation damping technology makes it possible to support physical objects with no actual physical contact, its merits include reduction of problems related to friction and wear, the capability for motion at very high speeds, and low levels of vibration and noise. Furthermore, it can be used in special situations (also a special characteristic of magnets), as well as having the advantage of its force being effective in all directions For these reasons, magnetic levitation vehicles, magnetic bearings or the like which apply those special characteristics are being developed.

Of the levitation technologies that utilize magnetic forces, the majority utilize attractive forces. Magnetic circuits that make use of repulsive forces are difficult to utilize in vibration control systems, due to their instability and the fact that they are difficult to control (due to the marked non-linear characteristics of the repulsive forces).

SUMMARY OF THE INVENTION

The present invention has been developed to overcome the above- described disadvantages.

It is accordingly an objective of the present invention to provide a suspension unit capable of achieving vibration and shock absorption with a small stroke wherein linear characteristics of metallic springs and non-linear characteristics of a magneto-spring are joined to create a "combination spring" which has linear characteristics under normal conditions of use, but which is a non-linear spring system as a whole.

In accomplishing the above and other objectives, the suspension unit according to the present invention includes a lower frame, an upper frame vertically movably mounted on the lower frame, and two link mechanisms disposed on respective sides of the upper and lower frames for connecting them to each other. Each of the two link mechanisms includes a parallel link mechanism having two arms extending generally parallel to each other and a pantograph-shaped link mechanism having a plurality of arms. The suspension unit also includes two permanent magnets each fixedly mounted on one of the upper and lower frames with like magnetic poles opposed to each other, a metallic spring engaged with one of the pantograph-shaped link mechanisms, and a shock absorber engaged with the other of the pantograph-shaped link mechanisms that has spring properties.

With this arrangement, vibration below a predetermined amplitude is absorbed by the spring properties of the other of the pantograph-shaped link mechanisms with shock absorber not operated. furthermore, a combination of the linear characteristics of the metallic spring and the non-linear characteristics of the magneto-spring provides non-linear spring characteristics having a linearity in the region of normal use. Such characteristics achieve vibration and shock absorption with a small stroke.

Advantageously, the suspension unit further includes a plurality of metallic springs engaged with the upper frame and with a portion of the parallel link mechanism for producing a lifting force of the upper frame. It is therefore possible to provide a suspension unit having any arbitrary spring characteristics by appropriately setting the spring constant of the magneto-spring and that of the metallic springs.

Preferably, the shock absorber has spring properties in a direction axially thereof. With this construction, fine vibration to which input vibration has been attenuated is absorbed by the non-linear characteristics of the magneto-spring and the link mechanisms without being transmitted to the shock absorber, thus improving the vibration characteristics particularly in a high-frequency region.

Again preferably, the shock absorber has spring properties in a direction in which each end of the shock absorber slides. With this construction, fine vibration to which input vibration has been converted by the link mechanisms is not transmitted to the shock absorber, making it possible to improve the vibration characteristics in high-frequency and low-frequency regions.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

This application is based on application No. 11-38738 filed Feb. 17, 1999 in Japan, the content of which is incorporated hereinto by reference.

Referring now to the drawings, there is shown in FIGS. 1 to 4 a suspension unit S embodying the present invention. The suspension unit S shown therein includes a lower frame 2 that is to be fixedly mounted on a vehicle floor (the side of a vibration source) and an upper frame 4 vertically movably mounted on the lower frame 2 via link mechanisms.

The link mechanisms are disposed on respective sides of the suspension unit S. and each of them includes a parallel link mechanism having two arms 6a, 8a (or 6b, 8b) extending generally parallel to each other and a pantograph-shaped link mechanism having four arms 10a, 12a, 14a, 16a (or 10b, 12b, 14b, 16b).

The arms 6a, 6b in the parallel link mechanisms are each pivotally connected at a lower end and an intermediate portion thereof to the lower frame 2 and the upper frame 4 via pins 18, 19, respectively, while the other arms 8a, 8b are each pivotally connected at a lower end and an upper end thereof to the lower frame 2 and the upper frame 4 via pins 20, 21, respectively. On the other hand, each of the pantograph-shaped link mechanisms is pivotally connected at lower and upper ends thereof to the lower and upper frames 2, 4, respectively.

One of the pantograph-shaped link mechanisms includes two arms 10a, 12a, pivotally connected to each other via a pin 22, two arms 14a, 16a pivotally connected to each other via a pin 24, and a metallic spring (for example, a coil spring) 26 having opposite ends engaged with the pins 22, 24, respectively. The metallic spring 26 produces a force for lifting the upper frame 4 relative to the lower frame 2. The other of the pantograph-shaped link mechanisms includes two arms 10b, 12b pivotally connected to each other via a pin 28, two arms 14b, 16b pivotally connected to each other via a pin 30, and a shock absorber 36 having opposite ends engaged with the pins 28, 30 via sleeves 32, 33, respectively. The pin 28 is inserted into a rubber bushing 34, which is in turn partially inserted into a hole defined in the arm 10b. The pin 30 is similarly inserted into a rubber bushing 35, which is in turn partially inserted into a hole defined in the arm 14b. Also, a rubber bushing (not shown) is interposed between the pin 28 (30) and a hole defined in an end of the shock absorber 36.

A permanent magnet 40 is fixedly mounted on a holder 38 at a predetermined angle, which is in turn secured to the lower frame 2 at a front central portion thereof- Another permanent magnet 42 having a lower surface extending parallel to an upper surface of the permanent magnet 40 is fixedly mounted on a holder 44 at a predetermined angle, which is in turn secured to the upper frame 4. The two permanent magnets 40, 42 confront each other with like magnetic poles opposed to each other, thereby producing a force for lifting the upper frame 4 relative to the lower frame 2.

The holder 44 has a rod 46 secured thereto, with which one end of each of a plurality of metallic springs (for example, coil springs) 48 is engaged. The other end of each of the metallic springs 48 is engaged with a rod 50 fitted to upper ends of the arms 6a, 6b in the parallel link mechanisms.

Figure 5:
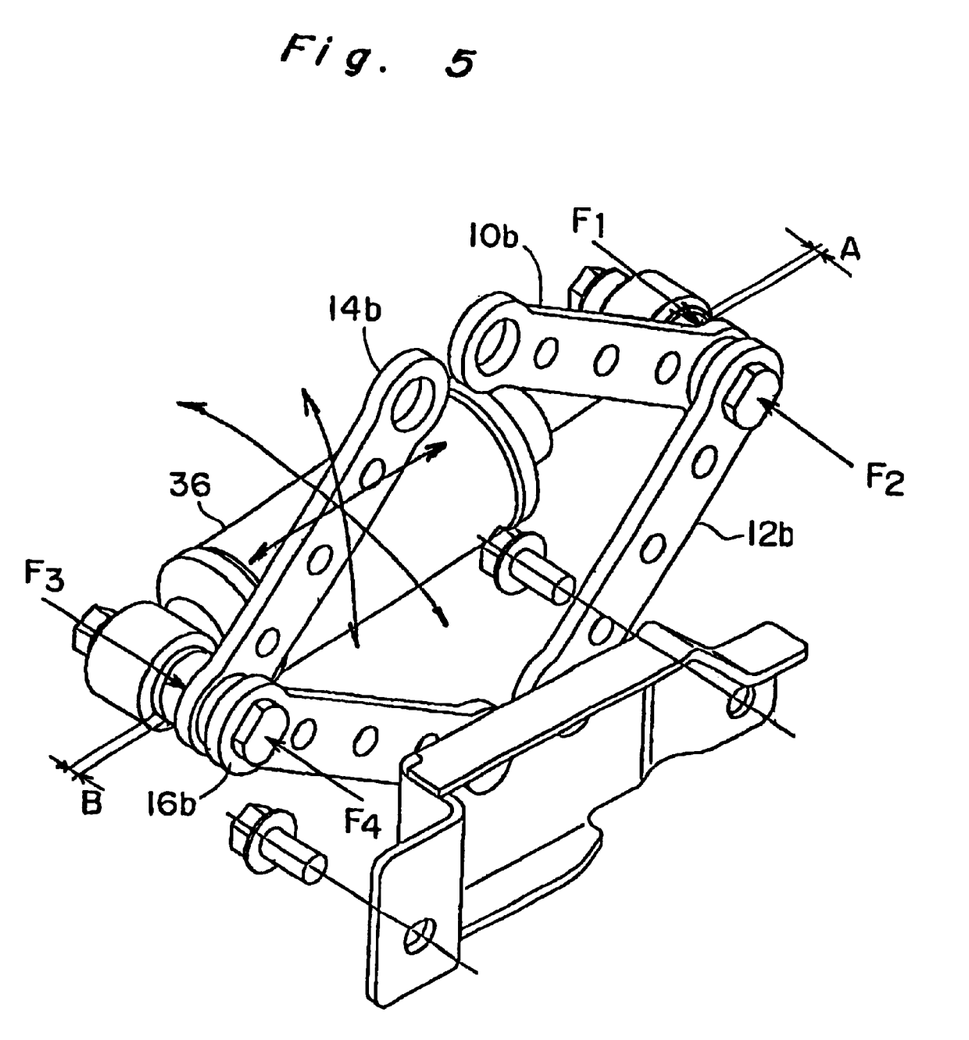
FIG. 5 is an exploded perspective view of a shock absorber and a link mechanism associated therewith, both mounted in the suspension unit of FIG. 1.

FIG. 5 depicts the shock absorber 36 and the pantograph-shaped link mechanism associated therewith. As shown therein, there are provided clearances A, B in directions axially of the pins 28, 30 at the opposite ends of the shock absorber 36, respectively. Because the rubber bushings 34, 35 are provided at the connections between the arms 10b, 12b and between the arms 14b, 16b, respectively, when loads F1, F2 and F3, F4 are applied to the connections, the arm ends are caused to slide in directions axially of the pins 28, 30, respectively. follows.

Figure 1:
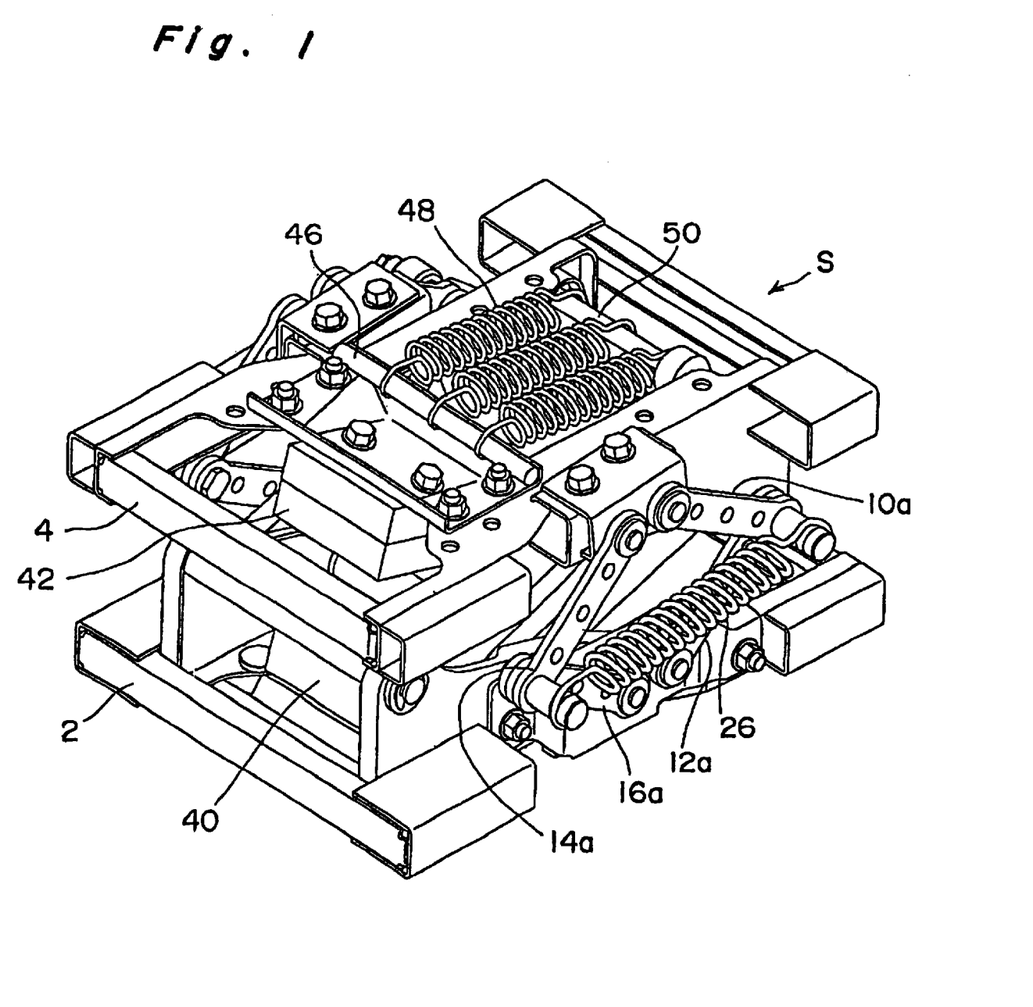
FIG. 1 is a perspective view of a suspension unit according to the present invention.
Figure 2:
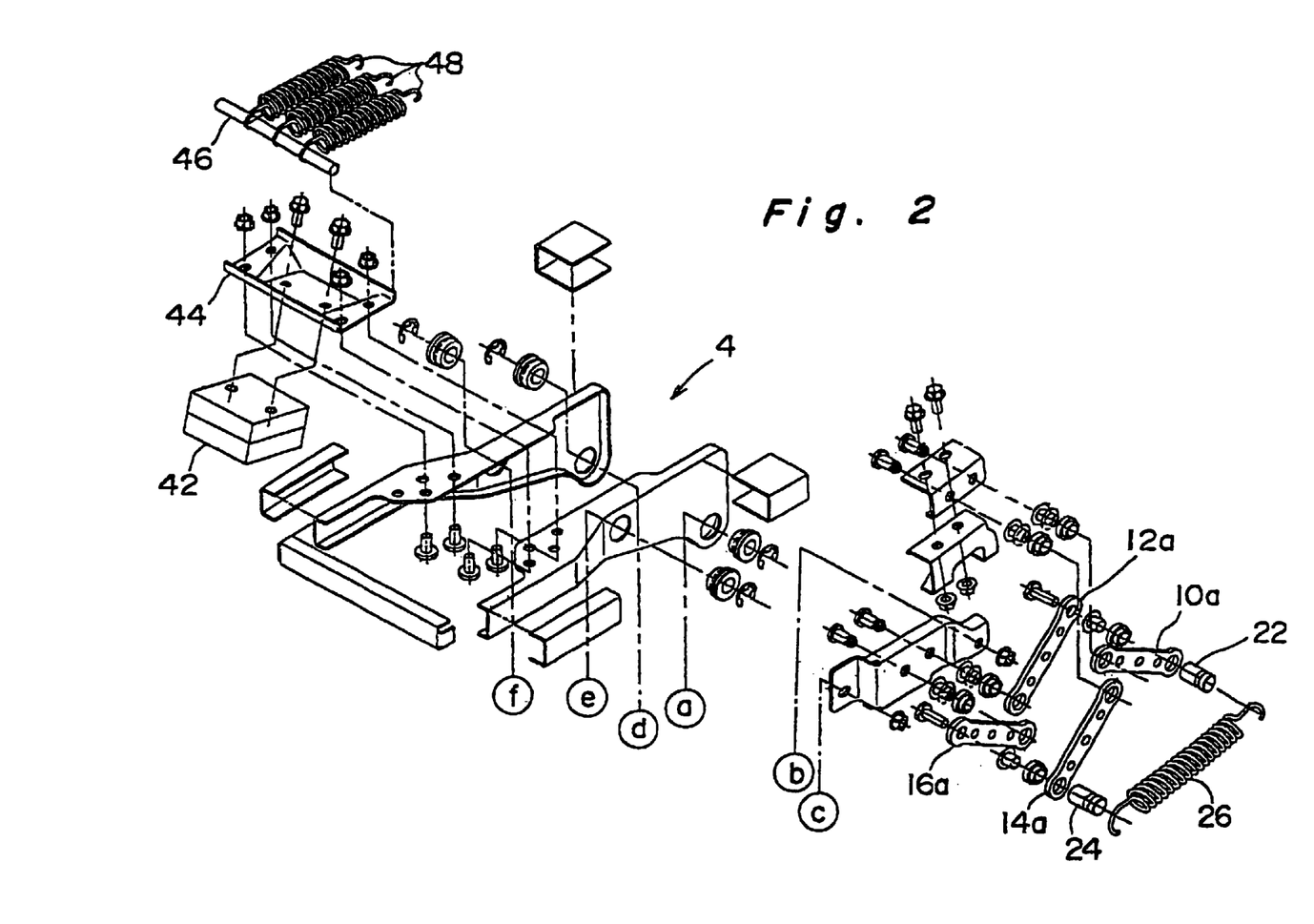
FIG. 2 is an exploded perspective view of a portion of the suspension unit of FIG. 1.
Figure 3:
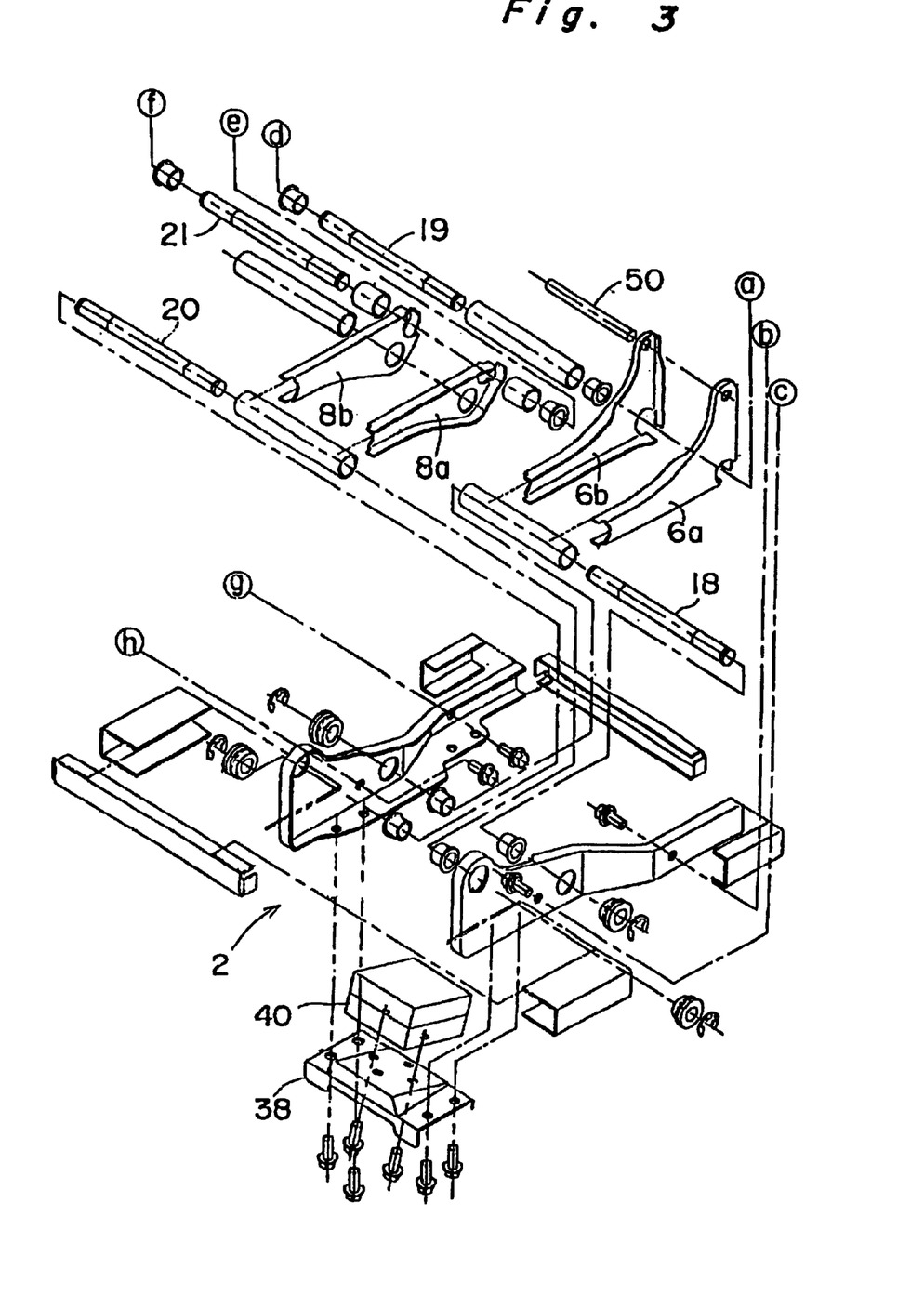
FIG. 3 is an exploded perspective view of another portion of the suspension unit of FIG. 1.
Figure 4:
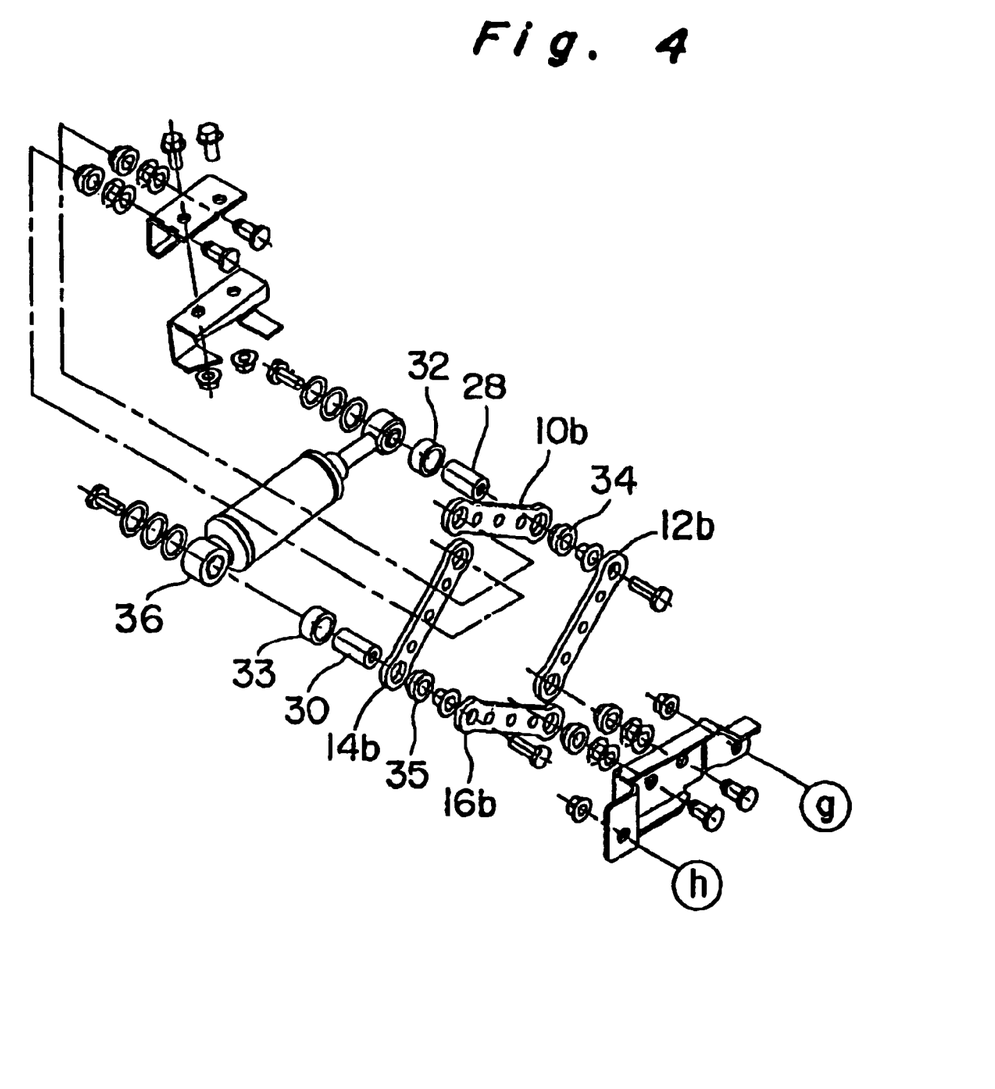
FIG. 4 is an exploded perspective view of a further portion of the suspension unit of FIG. 1.

The lower frame 2 is secured to the vehicle floor, while a seat is secured to the upper frame 4. When a user sits on the seat, the weight (load) of the user is supported by a repulsive force of the two permanent magnets 40, 42, a spring force of the metallic spring 26 engaged with the pantograph-shaped link mechanism, and spring forces of the metallic springs 48 engaged with the upper frame 4.

This suspension unit S has non-linear spring characteristics, as described later, and attenuates an input from the vibration source to a reduced amplitude. The link mechanisms then convert the attenuated vibration to fine vibration, which is in turn absorbed by vertical and horizontal spring functions of the link mechanisms (these spring functions are imparted by the rubber bushings or clearances at the opposite ends of the shock absorber 36 and the deflection of the links). Accordingly, the input from the vibration source is absorbed by the spring system with the shock absorber 36 not operated.

When an impulsive force has been inputted or when the amplitude has increased in a resonant region, the shock absorber 36 works beyond the spring functions of the link mechanisms to attenuate the impulsive force.

More specifically, vibration inputted to the lower frame 2 is transmitted in all directions of the link mechanisms or the shock absorber 36, as shown by arrows in FIG. 5. Fine vibration (vibration below a predetermined amplitude) applied to the shock absorber 36 in a direction axially thereof is absorbed by the rubber bushings disposed at the opposite ends thereof, while fine vibrations (vibrations below a predetermined amplitude) applied to the shock absorber 36 in directions (these directions are hereinafter referred to as sliding directions) axially of the pins 28, 30 are absorbed by the aforementioned rubber bushings and the rubber bushings 34, 35 interposed between the two arms 10b, 12b and between the two arms 14b, 16b.

In a certain suspension unit S, under the condition in which the clearances A, B shown in FIG. 5 have been set to 3 mm, the amount of movement of the link mechanism on the shock absorber 36 in the axil. rections of the pins 28, 30 was measured, and the following results were obtained.

| Load | Movement | Clearance | Total Looseness |
|---|---|---|---|
| F1, F2: 10 kg | 5.5 mm | A: 3 mm | 8.5 mm |
| F3, F4: 10 kg | 3.5 mm | B: 3 mm | 6.5 mm |

Accordingly, the load-deflection curve exhibits non-linear spring characteristics of k (spring constant)≈0 in the range of the total looseness referred to above and, hence, fine vibration before the shock absorber 36 works is absorbed by such spring function.

Figure 6:
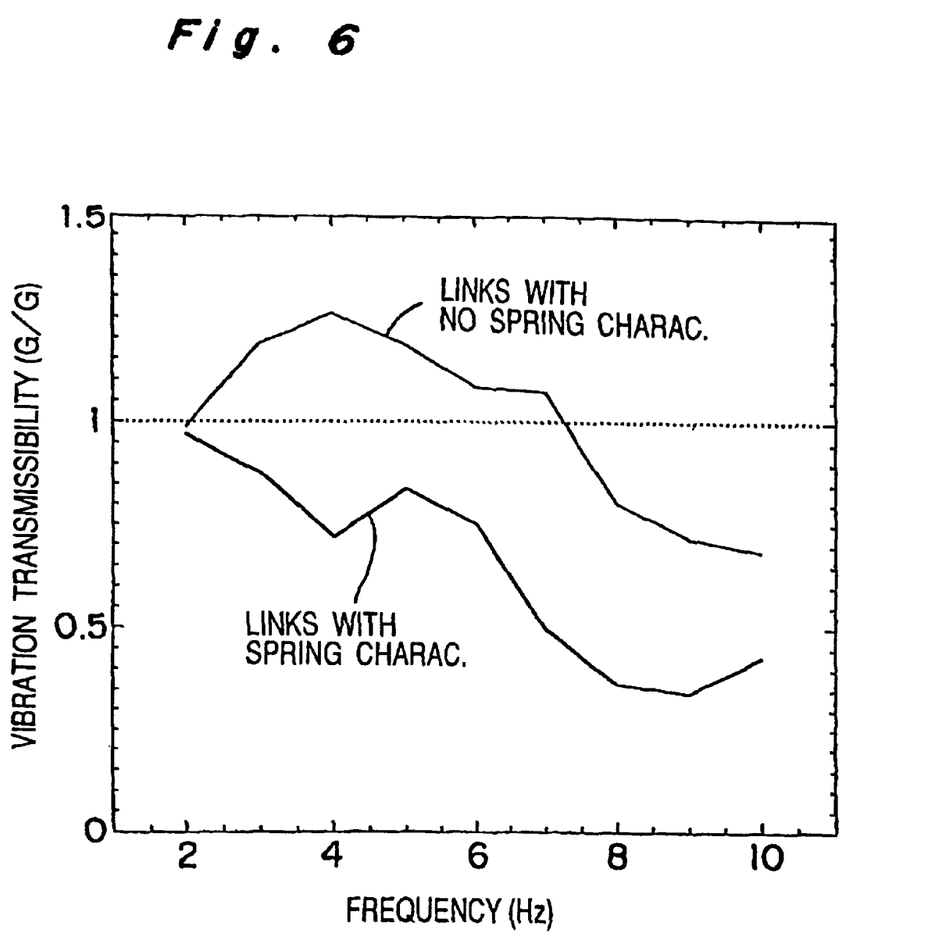
FIG. 6 is a graph showing dynamic characteristics of the suspension unit when the shock absorber of FIG. 5 has spring properties and when it has no spring properties.

FIG. 6 depicts the dynamic characteristics of the suspension unit S shown in FIG. 1 where the link mechanism has the above spring characteristics and where it has no spring characteristics. The input amplitude was 10 mm. This graph reveals that the input vibration can be appropriately attenuated by imparting the spring characteristics to the link mechanism. It is to be noted that the dynamic characteristics at the time that the shock absorber 36 was removed are the same as those at the time that the spring characteristics were imparted to the link mechanism.

Figure 7A:
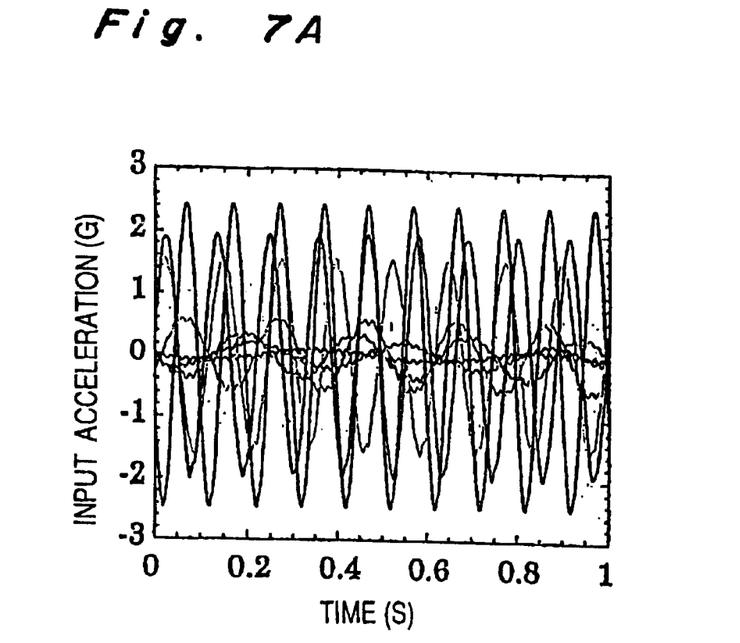
FIG. 7A is a graph showing input acceleration when vibrations of 2 to 10 Hz were applied to the suspension unit of FIG. 1.
Figure 7B:
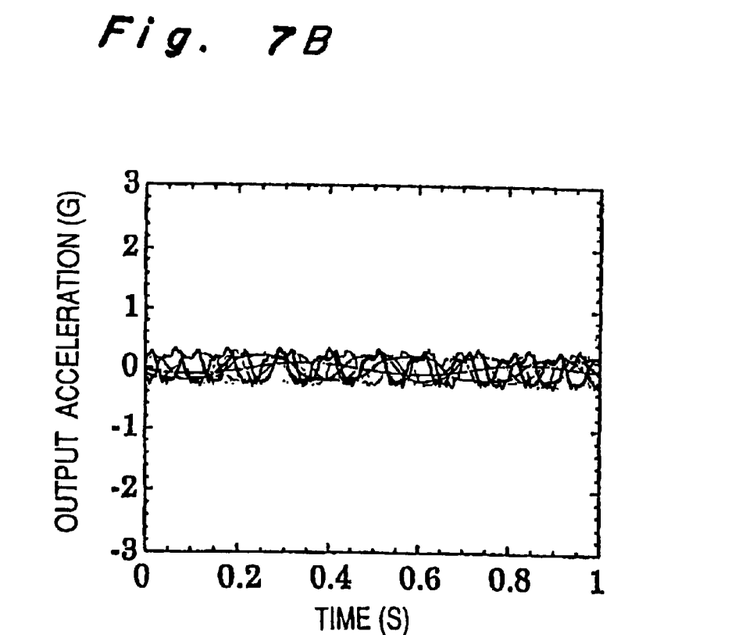
FIG. 7B is a graph showing output acceleration when vibrations of 2 to 10 Hz were applied to the suspension unit of FIG. 1.

FIGS. 7A and 7B depict input and output accelerations, respectively, at the time that vibrations of 2 to 10 Hz were applied to the suspension unit S of FIG. 1. As can be seen therefrom, the input vibrations are attenuated to the output accelerations of substantially the constant amplitude, regardless of the frequency.

Figure 8:
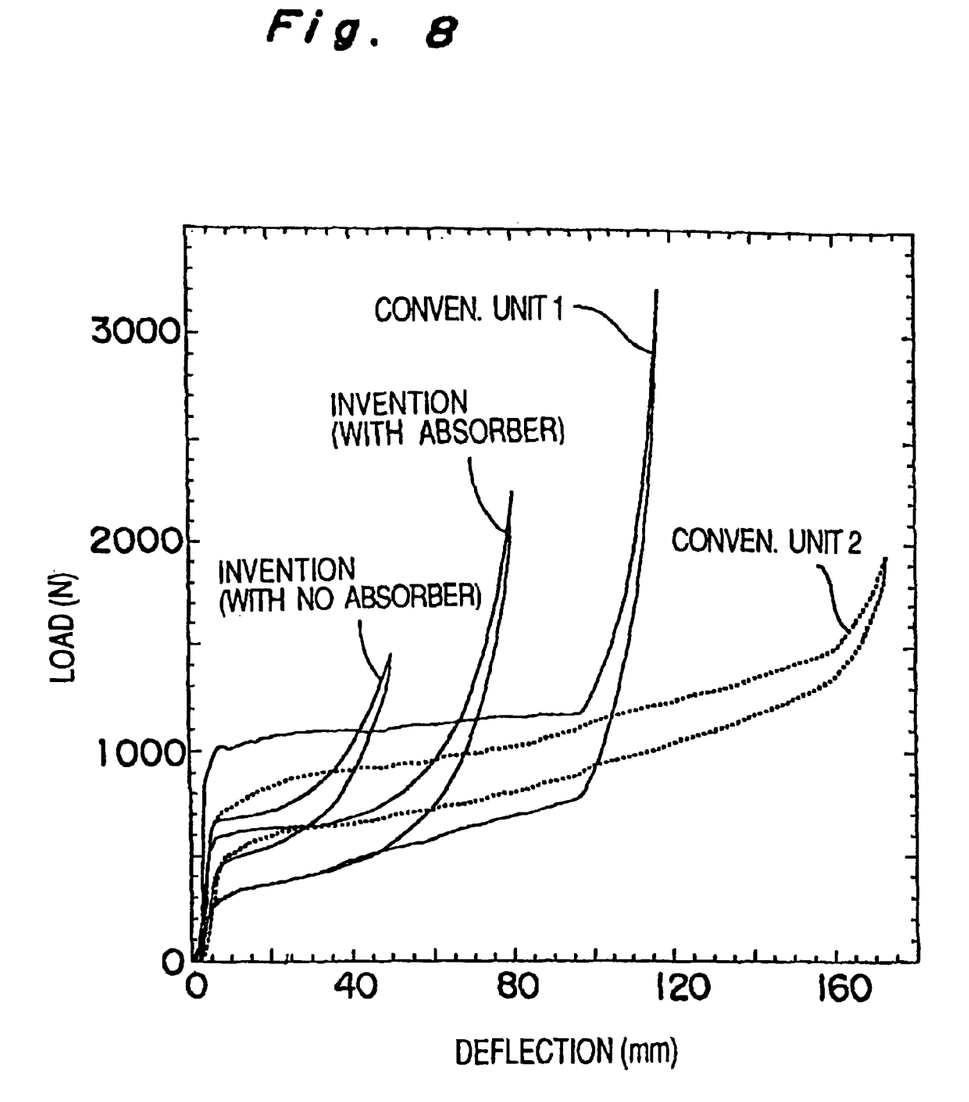
FIG. 8 is a graph showing static characteristics of the suspension unit of FIG. 1 and those of the conventional suspension units.
Figure 9:
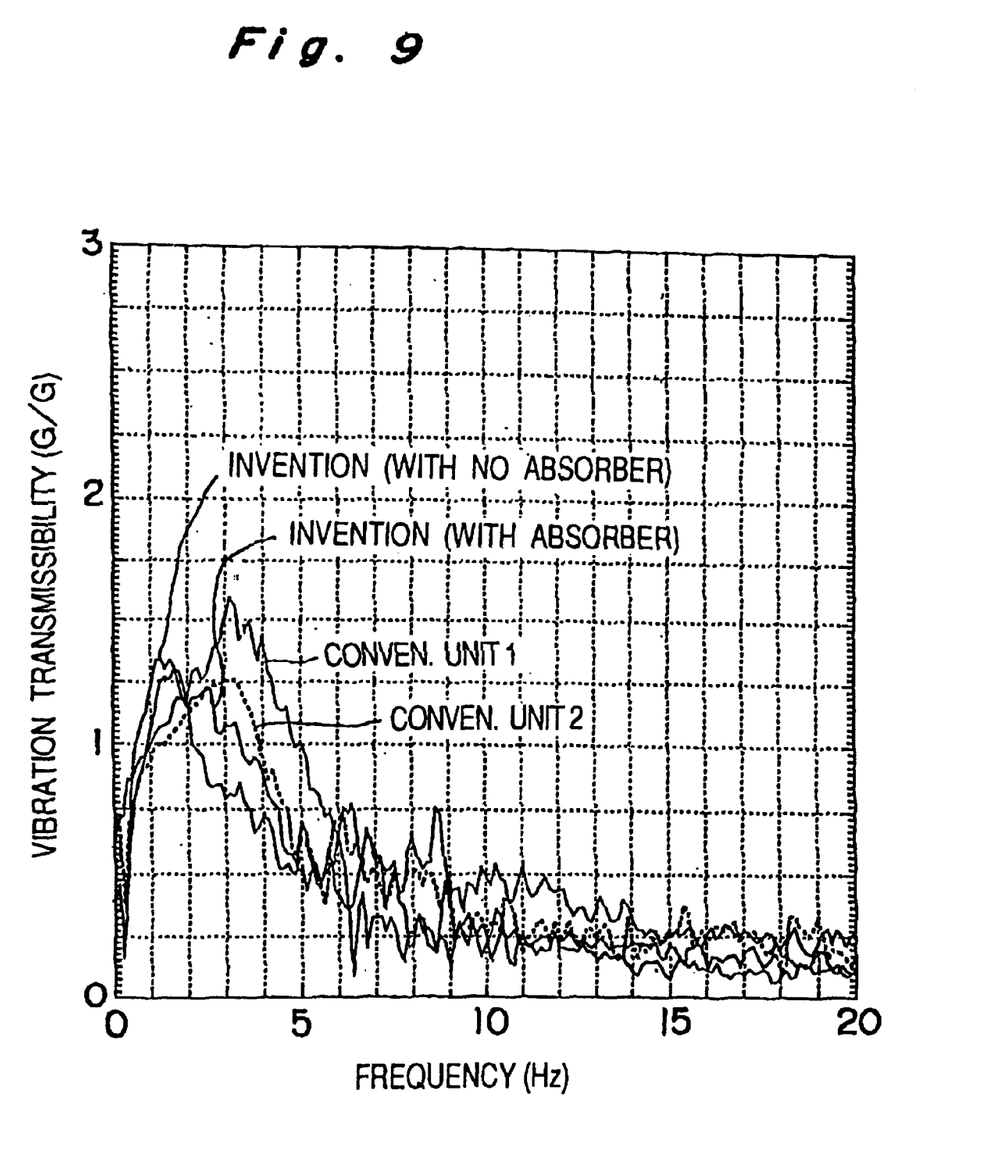
FIG. 9 is a graph showing dynamic characteristics of the suspension unit of FIG. 1 and those of the conventional suspension units.

FIGS. 8 and 9 depict static characteristics and dynamic characteristics of the suspension unit S of FIG. 1, a suspension unit S from which the shock absorber 36 has been removed, and conventional suspension units. In the figures, the conventional unit 1 employs a shock absorber having a large damping force, while the conventional unit 2 employs a shock absorber having a small damping force. In preparing these graphs, a three-axis exciter was used.

As can be seen from the graphs, the stroke is restricted in the conventional unit 1, while the stroke is large in the conventional unit 2, though it has good vibration and shock characteristics. On the other hand, the suspension unit S of FIG. 1 according to the present invention has a stroke smaller than that of the convention units, but the suspension unit S exhibits substantially the same characteristics as the conventional unit 2. Compared with the suspension unit S having no shock absorber, the suspension unit S having the shock absorber 36 has reduced spring constants and an increased stroke, because the shock characteristics are improved by enhancing the damping characteristics with the use of the shock absorber 36.

The suspension unit S according to the present invention exhibits non-linear spring characteristics that have a linearity in the region of normal use by combining the linear characteristics of the metallic springs and the non-linear characteristics of the magneto-spring. The stroke of the suspension unit S is small as a whole, compared with the conventional units.

With regard to the dynamic characteristics, the suspension unit S according to the present invention has a small vibration transmissibility as a whole, compared with the conventional units. Not only is the resonant frequency shifted to the low-frequency side, but the vibration and shock absorption can also be achieved with a small stroke.

Figure 10A:
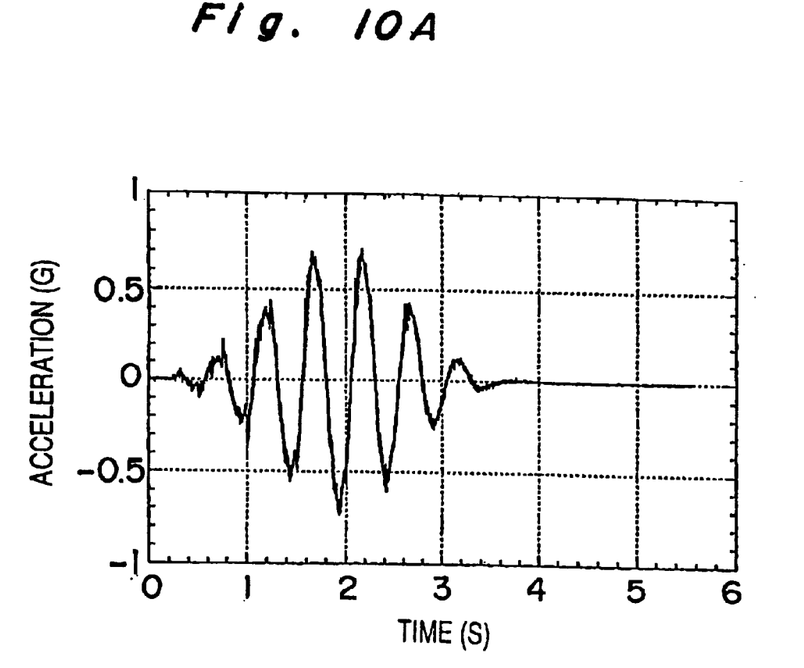
FIG. 10A is a graph showing a waveform on the platform (input waveform) when each of the suspension unit of FIG. 1 and the conventional suspension unit was used.
Figure 10B:
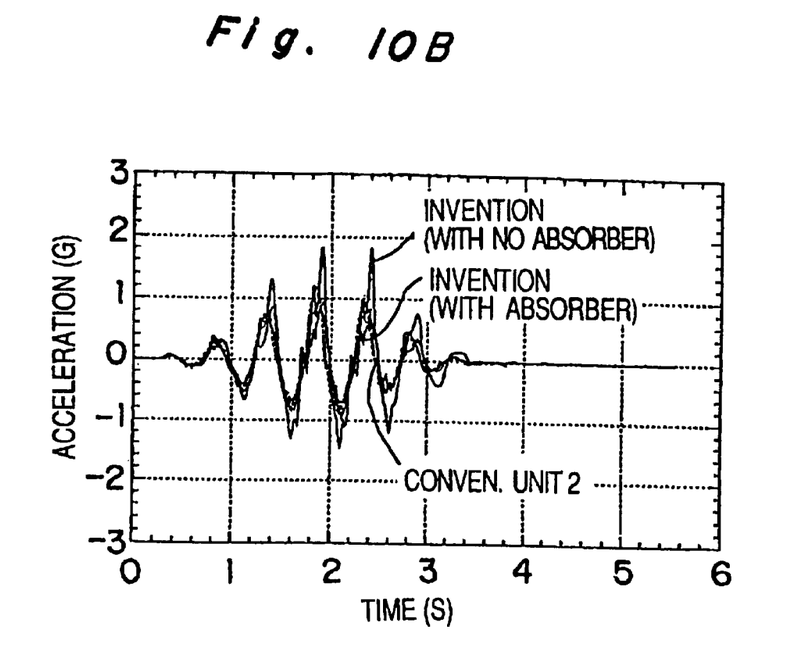
FIG. 10B is a graph showing a waveform under the hips (output waveform) when each of the suspension unit of FIG. 1 and the conventional suspension unit was used.

FIGS. 10A and 10B depict a waveform on the platform and a waveform under the hips, respectively, both showing a change in acceleration when the suspension unit S according to the present invention was used and when the conventional unit was used. Although the acceleration is large in the-suspension unit S having no shock absorber, the acceleration is reduced by the shock absorber.

Figure 11:
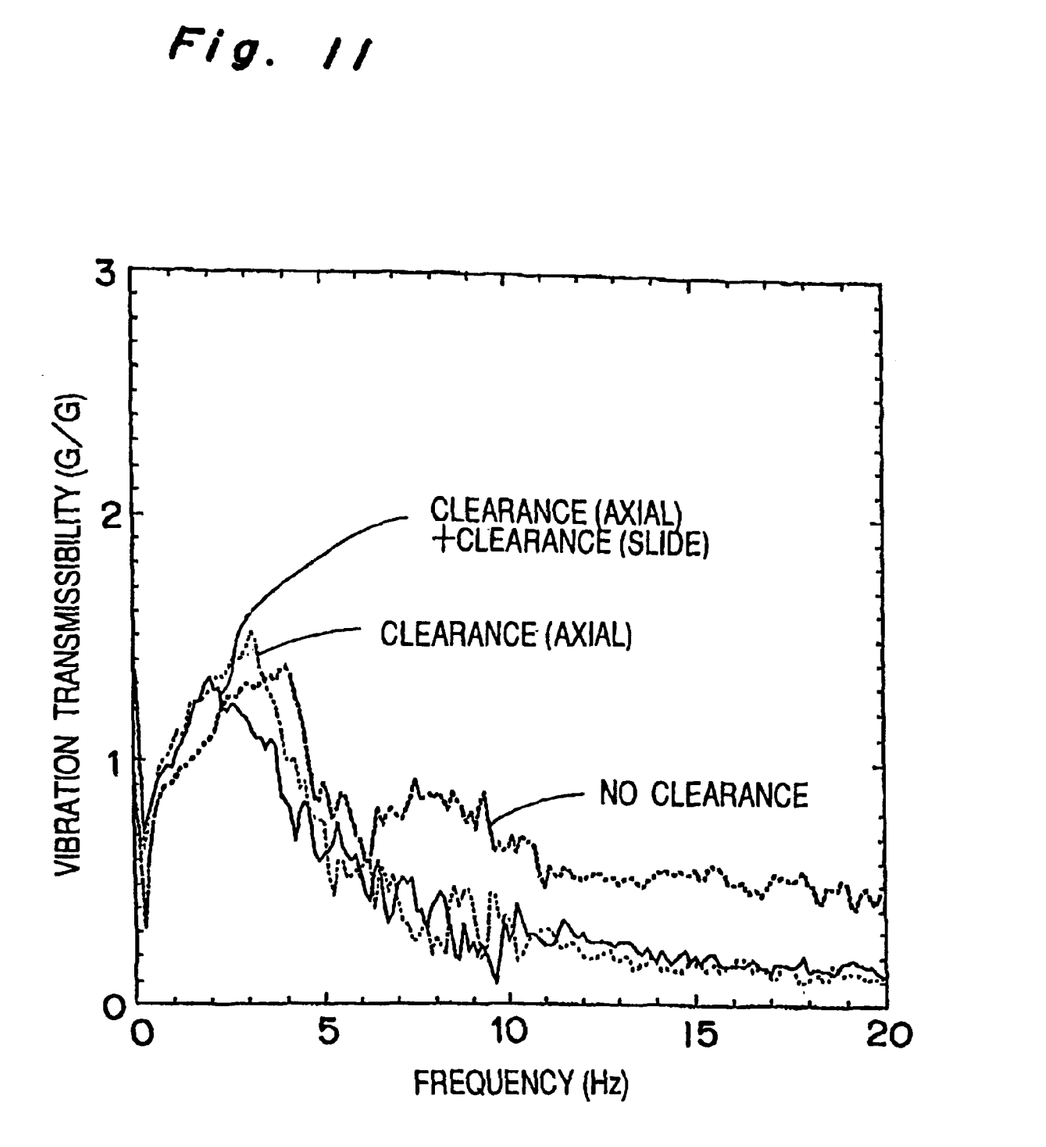
FIG. 11 is a graph showing dynamic characteristics of the suspension unit of FIG. 1 when the shock absorber of FIG. 5 has clearances at its mounts and when it has no clearances.

FIG. 11 depicts dynamic characteristics where the shock absorber 36 has the clearances (looseness) in the axial direction or the sliding direction thereof and where it has no clearances. These graphs were obtained when an automotive vehicle was running at a speed of 80 kmh on the Metropolitan Highway (the weight of a subject: 60 kg).

As can be seen from FIG. 11, where rubber bushings (clearances or looseness) are provided in the axial direction or the sliding direction of the shock absorber 36, a spring-mass system is formed around the shock absorber 36 by virtue of its spring characteristics, thereby reducing the vibration transmissibility in a high-frequency region and the vibration transmissibility at a resonant point.

Figure 12:
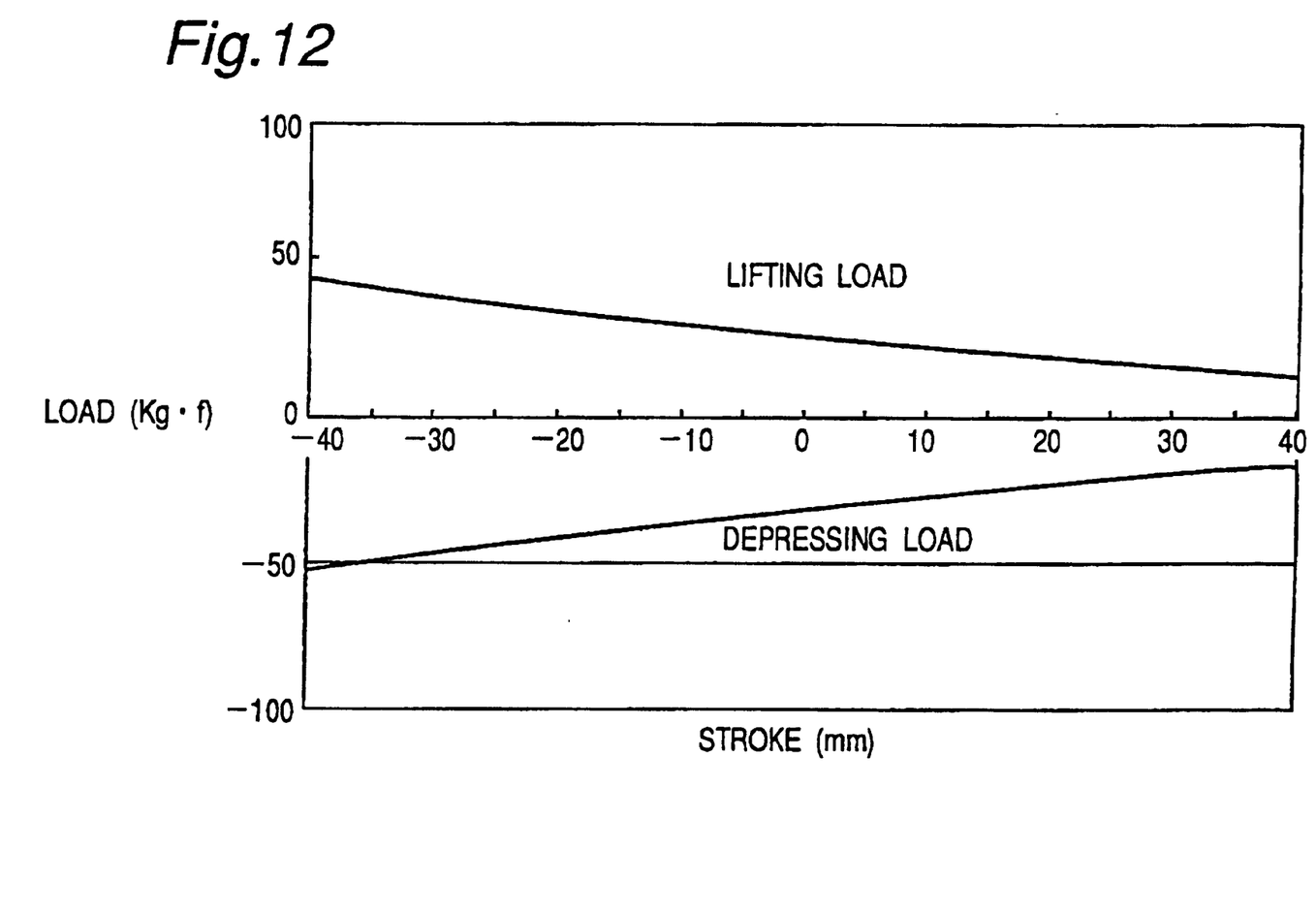
FIG. 12 is a graph showing a lifting load and a depressing load of the shock absorber of FIG. 6.
Figure 13:
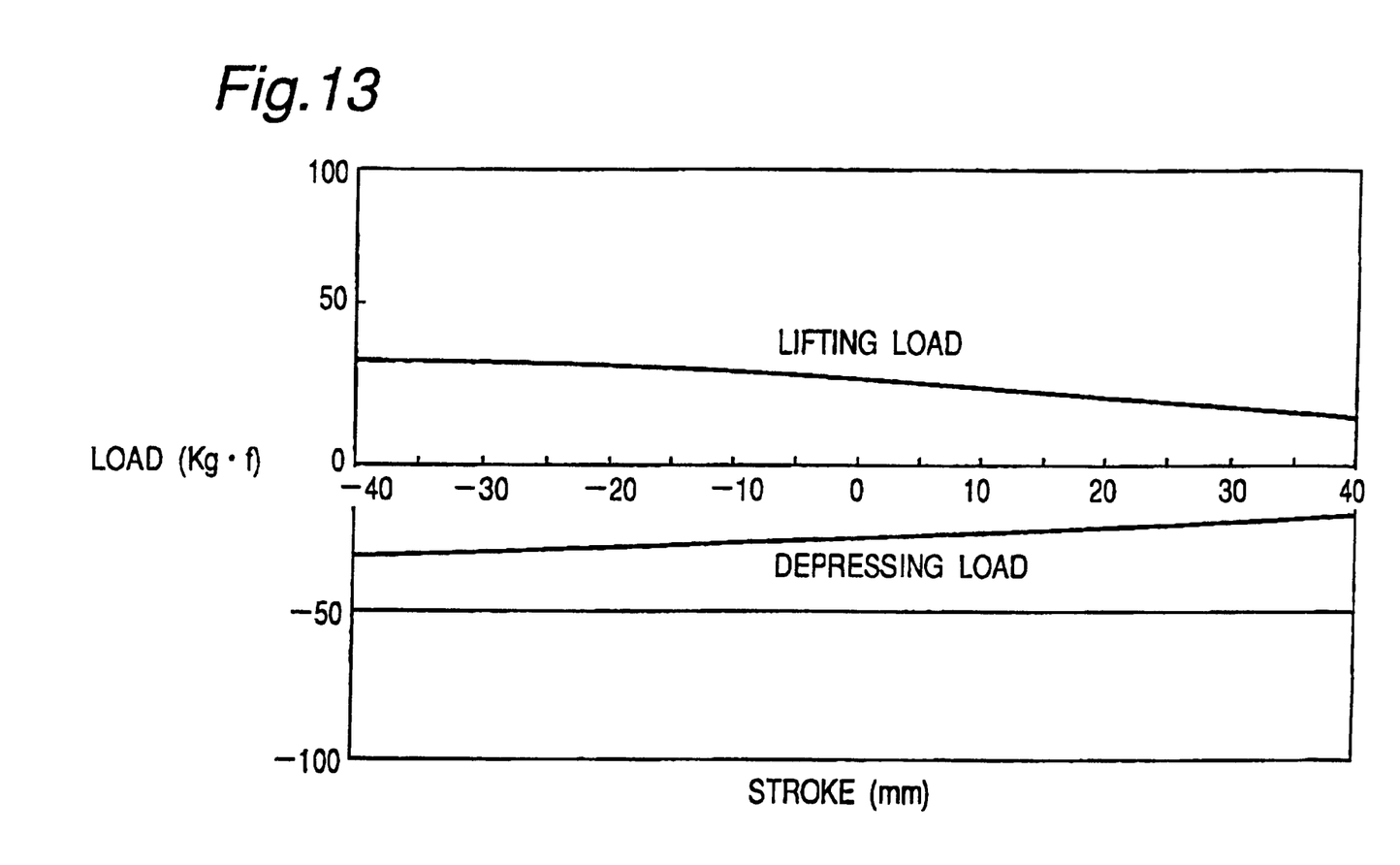
FIG. 13 is a graph showing a lifting load and a depressing load of the shock absorber mounted in the conventional suspension unit.

FIG. 12 depicts a lifting load and a depressing load of the shock absorber 36 mounted in the suspension unit S according to the present invention, while FIG. 13 depicts those of a shock absorber directly connected to the upper and lower frames in a conventional suspension unit. The shock absorber 36 mounted in the suspension unit S according to the present invention has been somewhat adjusted to lighten the top-end shock and the bottom-end shock. Also, the efficiency of the damping function is increased by making use of a component of a force applied to the links. It is to be noted that the lifting load referred to above is a load applied to the shock absorber 36 when the upper frame 4 moves away from the lower frame 2, and the depressing load referred to above is a load applied to the shock absorber 36 when the upper frame 4 moves towards the lower frame 2.

It is also to be noted that although in the above-described embodiment there are provided clearances between one end of the shock absorber 36 and the connection of the two arms 10b, 12b and between the other end of the shock absorber 36 and the connection of the two arms 14b, 16b, a coil spring may be provided at each clearance to impart spring properties.

It is further to be noted that although in the above-described embodiment the shock absorber 36 is positioned outside the pantograph-shaped link mechanism, the former may be positioned inside the latter. In this manner, drawing the shock absorber 36 near the permanent magnets 40, 42 imparts the spring properties to the shock absorber 36 by virtue of the attractive force of the permanent magnets 40, 42.

Although the rubber bushings mounted on the opposite ends of the shock absorber 36 generally have a round through-hole, they may have a through-hole of a different shape, making it possible to reduce the spring constants.

Furthermore, In place of the magneto-spring employed in the above-described embodiment, metallic springs or air springs can be used.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A suspension unit comprising:

a lower frame;

an upper frame vertically movably mounted on said lower frame;

two link mechanisms disposed on respective sides of said upper and lower frames for connecting said upper and lower frames to each other, each of said two link mechanisms comprising a parallel link mechanism having two arms extending generally parallel to each other and a pantograph-shaped link mechanism having first, second, third and fourth arms, said first and second arms being connected to each other at a first connecting portion, said third and fourth arms being connected to each other at a second connecting portion, said first and third arms being connected to said upper frame, and said second and fourth arms being connected to said lower frame;

two permanent magnets each fixedly mounted on one of said upper and lower frames with like magnetic poles opposed to each other;

a metallic spring engaged with one of said pantograph-shaped link mechanisms; and a shock absorber having a first end and a second end opposite to each other, said first end being connected to said first connecting portion of one of said two link mechanisms, said second end being connected to said second connecting portion of said one of said two link mechanisms, said first and second connecting portions of said one of said two link mechanisms having respective vibration-absorbing spring properties such that vibration below a predetermined amplitude is absorbed by the spring properties of said first and second connecting portions of said one of said two link mechanisms with said shock absorber not operated.

2. The suspension unit according to claim 1, further comprising a plurality of metallic springs engaged with said upper frame and with a portion of at least one of said parallel link mechanisms for producing a lifting force of said upper frame.

3. The suspension unit according to claim 1, wherein said first and second connecting portions of said one of said two link mechanisms are arranged such that said vibration-absorbing spring properties thereof act in a direction axially of said shock absorber.

4. The suspension unit according to claim 3, wherein said first and second connecting portions of said one of said two link mechanisms are arranged such that said vibration-absorbing spring properties thereof act in a direction in which each of said first and second ends of said shock absorber slides.

5. The suspension unit according to claim 1, wherein said one of said pantograph-shaped link mechanisms with which said metallic spring is engaged is part of the other of said two link mechanisms.

6. The suspension unit according to claim 5, wherein said metallic spring comprises first and second ends opposite to each other, and said first and second ends of said metallic spring are respectively connected to said first and second connecting portions of said other of said two link mechanisms.

7. The suspension unit according to claim 1, wherein said metallic spring comprises first and second ends opposite to each other, and said first and second ends of said metallic spring are respectively connected to said first and second connecting portions of the other of said two link mechanisms.

* * * * *